(12) United States Patent
Takabayashi et al.

(10) Patent No.: US 8,877,827 B2
(45) Date of Patent: Nov. 4, 2014

(54) ACTIVE RAY-CURABLE INKJET INK, AND IMAGE FORMATION METHOD

(75) Inventors: Toshiyuki Takabayashi, Tokyo (JP); Hirotaka Iijima, Tokyo (JP); Akio Maeda, Tokyo (JP); Masashi Ikeda, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/000,723

(22) PCT Filed: Feb. 23, 2012

(86) PCT No.: PCT/JP2012/001245
§ 371 (c)(1),
(2), (4) Date: Aug. 21, 2013

(87) PCT Pub. No.: WO2012/114759
PCT Pub. Date: Aug. 30, 2012

(65) Prior Publication Data
US 2013/0335479 A1    Dec. 19, 2013

(30) Foreign Application Priority Data
Feb. 24, 2011 (JP) .................. 2011-037973

(51) Int. Cl.
| | |
|---|---|
| C09J 7/02 | (2006.01) |
| B41M 7/00 | (2006.01) |
| B29C 71/04 | (2006.01) |
| C08F 2/46 | (2006.01) |
| A61L 2/08 | (2006.01) |
| A61L 24/00 | (2006.01) |
| C08G 61/04 | (2006.01) |
| C09D 11/38 | (2014.01) |
| C09D 4/00 | (2006.01) |
| C09D 11/101 | (2014.01) |

(52) U.S. Cl.
CPC C09D 11/38 (2013.01); C09D 4/00 (2013.01); C09D 11/101 (2013.01)
USPC ...... 522/80; 522/74; 522/71; 522/1; 522/189; 522/184; 520/1

(58) Field of Classification Search
CPC ......... C09D 11/38; C09D 4/00; C09D 11/101
USPC ................. 520/1; 522/80, 74, 71, 1, 189, 184
See application file for complete search history.

(56) References Cited

U.S. PATENT DOCUMENTS

| | | | |
|---|---|---|---|
| 7,423,072 B2 | 9/2008 | Lee et al. | |
| 7,427,360 B2 * | 9/2008 | Hopper et al. | ................... 216/13 |
| 8,697,194 B2 * | 4/2014 | Odell et al. | ................... 427/517 |
| 2007/0058020 A1 | 3/2007 | Wetjens et al. | |
| 2009/0038506 A1 | 2/2009 | Odell et al. | |
| 2009/0046134 A1 | 2/2009 | Belelie et al. | |
| 2009/0246403 A1 | 10/2009 | Wetjens et al. | |
| 2012/0327157 A1 * | 12/2012 | Iijima et al. | ..................... 347/20 |

FOREIGN PATENT DOCUMENTS

| | | |
|---|---|---|
| JP | 2005-126507 A | 5/2005 |
| JP | 2005-255821 A | 9/2005 |
| JP | 2009-41015 A | 2/2009 |
| JP | 2009-510184 A | 3/2009 |
| JP | 2010-208343 A | 9/2010 |
| WO | WO 2010/125854 A1 | 11/2010 |
| WO | 2011/111733 | * 9/2011 |

OTHER PUBLICATIONS

International Search Report and Written Opinion of PCT/JP2012/001245 dated May 29, 2012.

* cited by examiner

*Primary Examiner* — Ling Choi
*Assistant Examiner* — Jessica E Whiteley
(74) *Attorney, Agent, or Firm* — Lucas & Mercanti, LLP

(57) ABSTRACT

The active ray-curable inkjet ink comprises a gelling agent, photopolymerizable compounds and a photoinitiator, and reversibly transitions into a sol-gel phase according to the temperature. Therein: (1) a (meth)acrylate compound having a molecular weight of 300-1,500 and having 3-14 (—CH$_2$—CH$_2$—O—) structural units within a molecule is included as the first photopolymerizable compound at a proportion of 30-70 mass % relative to the total mass of the ink; (2) a (meth)acrylate compound having a molecular weight of 300-1,500 and a C log P value of 4.0-7.0 is included as the second photopolymerizable compound at a proportion of 10-40 mass % relative to the total mass of the ink; and (3) the gelling agent has a total of at least 12 carbon atoms, and has a straight or branched alkyl chain including at least three carbon atoms.

8 Claims, 1 Drawing Sheet

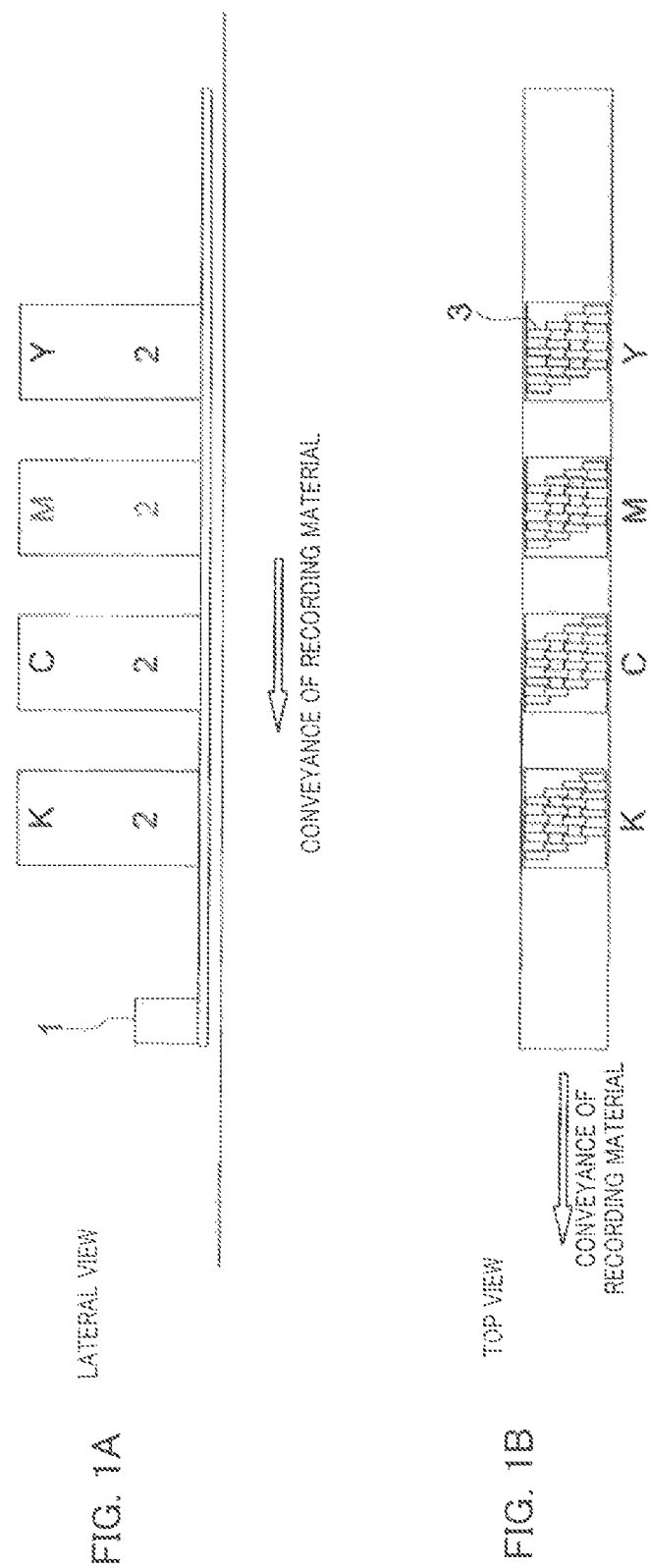

US 8,877,827 B2

ACTIVE RAY-CURABLE INKJET INK, AND IMAGE FORMATION METHOD

CROSS-REFERENCE TO RELATED APPLICATIONS

This application is a 371 of PCT/JP2012/001245 filed on Feb. 23, 2012, which claims the priority of JP Application Serial No. 2011-037973 filed on Feb. 24, 2011, the contents of each of which are incorporated herein by reference.

TECHNICAL FIELD

The present invention relates to an active ray-curable inkjet ink containing a gelling agent and an active ray-curable composition, and an image forming method using this ink.

BACKGROUND ART

Active ray-curable compositions that are cured by active energy rays such as ultraviolet radiation or electron beam have been hitherto put to practical use in various applications such as coating materials for plastics, paper, wood, inorganic materials and the like, adhesives, printing inks, printing circuit boards and electrical insulation relationships.

Furthermore, regarding inkjet ink systems which use these polymerizable compositions, there are available ultraviolet-curable inkjet inks that are cured by ultraviolet radiation (hereinafter, appropriately abbreviated to "UV"). Inkjet systems that use these ultraviolet-curable inks have fast-drying properties, so that recording can be achieved on recording materials which lack ink absorbing properties, and therefore, attention has been paid to these inkjet systems in recent years.

However, in an image forming method using these ultraviolet-curable inkjet systems, there is a problem that adjoining dots coalesce at the time of high speed recording for example, in the case of a line recording system, conveyance speed of the recording material: 30 m/s or higher, and in the case of a serial (shuttle) recording system, printing speed: 50 m$^2$/hr or higher), and the image quality deteriorates.

As a technology which is capable of inkjet recording regardless of the kind of the recording material and prevents "coalescence of adjoining dots" that becomes a problem at the time of inkjet recording, it is known to use a UV-curable ink containing a gelling agent (see Patent Literatures (hereinafter, abbreviated as PTL) 1 to 3).

For example, PTL 1 discloses an inkjet ink containing an oil to gelling agent and a photopolymerizable compound, and cationic polymerizable compounds or radical polymerizable compounds are disclosed as the photopolymerizable compounds.

Furthermore, PTL 2 discloses a phase change ink containing a curable monomer, a gelling agent, a branched polymer having a photoinitiator moiety in the molecule, and a coloring material, and radical polymerizable compounds are disclosed as the curable monomer.

PTL 3 discloses a phase change ink containing a white pigment, a curable monomer, a gelling agent and a photoinitiator, and radical polymerizable compounds are disclosed as the curable monomer.

However, in these ink compositions disclosed in PTL 1 to 3, control of dot coalescence at the time of high speed recording such as described above is still insufficient. Furthermore, there is a problem that ejection stability is not sufficient, and high quality images cannot be formed with satisfactory reproducibility.

Furthermore, in general UV-curable inks, the problem that printed matters curl up as a result of curing shrinkage at the time of UV irradiation, or that when a printed matter is bent, the image film is damaged, is prevented by using the relative low molecular weight, monofunctional and bifunctional radical polymerizable compounds disclosed in PTL 1 to 3 as the polymerizable compounds. However, in inks containing a gelling agent and a photopolymerizable compound, when a relatively low molecular weight radical polymerizable compound having a molecular weight of less than 300 is used, there is a problem that the stability of the ink composition at a temperature capable of ink ejection becomes insufficient, or there is a problem in terms of environmental hygiene that the foul odor of the ink itself or the foul odor of the printed matter after wring, is strong.

As a technology of suppressing curing shrinkage without impairing curability, it is well known to use the trifunctional or higher functional polymerizable compound having an ethylene oxide (EU) unit in the molecule as disclosed in PTL 1. However, when a polyfunctional polymerizable compound of trifunctionality or higher functionality having many ethylene oxide (EU) units in the molecule is used in a large amount, hydrophilicity of the ink as a whole becomes very high. Therefore, it is difficult to allow a gelling agent to exist stably in a highly hydrophilic ink, and an ultraviolet-curable inkjet ink composition which satisfies all of high image quality, curability, curing, shrinkage has not been known,

CITATION LIST

Patent Literature

PTL 1
Japanese Patent Application Laid-Open No. 2005-265
PTL 2
US Patent Application Publication No. 2009/0046134 A1
PTL 3
US Patent Application Publication No. 2009/0038506 A1

SUMMARY OF INVENTION

Technical Problem

The present invention was made in view of the problems and circumstances described above, and it is an object of the present invention to provide an active ray-curable inkjet ink which can form high definition images stably even in high speed recording, and has satisfactory adaptability to various recording materials. Another object is to provide an image forming method which uses the inkjet ink.

Solution to Problem

The above-described objects related to the present invention are solved by the following means.

[1] An active ray-curable inkjet ink containing a gelling agent, photopolymerizable compounds and a photoinitiator, the inkjet ink undergoing reversible sol-gel phase transition depending on temperature, wherein (1) the active ray-curable inkjet ink contains, as a first photopolymerizable compound, a (meth)acrylate compound having a molecular weight in the range of 300 to 1500 and having 3 to 14 unit structures represented by formula: ($-CH_2-CH_2-O-$) in the molecule, in an amount in the range of 30% to 70% by mass relative to the total mass of the ink;

(2) the active ray-curable inkjet ink contains, as a second photopolymerizable compound, a (meth)acrylate compound having a molecular weight in the range of 300 to 1500 and having a C log P value in the range of 4.0 to 7.0, in an amount in the range of 10% to 40% by mass relative to the total mass of the ink; and (3) the gelling agent has a total carbon number of 12 or greater and contains a linear or branched alkyl chain having 3 or more carbon atoms.

[2] The active ray-curable inkjet ink as described in item [1], wherein the active ray-curable inkjet ink further contains a coloring material.

[3] The active ray-curable inkjet ink as described in item [1] or [2], wherein the second photopolymerizable compound is at least one (meth)acrylate compound between the following items (4) and (5):

(4) a trifunctional or higher-functional (meth)acrylate compound having 3 to 14 unit structures represented by formula: (—C(CH$_3$)H—CH$_2$—O—) in the molecule; and (5) a bifunctional or higher-functional (meth)acrylate compound having a cyclic structure in the molecule.

[4] The active ray-curable inkjet ink as described in any one of items [1] to [3] wherein the gelling agent is at least one compound between compounds represented by the following Formulas (G1) and (G2):

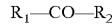    Formula (G1):

    Formula (G2):

wherein $R_1$ to $R_4$ each independently represent an alkyl chain having a straight-chain moiety having 3 to 36 carbon atoms, which may also have a branch.

[5] An image forming method of using the active ray-curable inkjet ink as described in any one of items [1] to [4], wherein when the active ray-curable inkjet ink impacts on a recording material, the temperature of the recording material is adjusted to the range of (sol-gel phase transition temperature +−20° C.) to (sol-gel phase transition temperature +−10° C.) of the active ray-curable inkjet ink.

Advantageous Effects of Invention

There can be provided, through the means of the present invention, an active ray-curable inkjet ink which can form high-definition images stably even in high speed recording and has satisfactory adaptability to various recording materials. Furthermore, an image forming method using the active ray-curable inkjet ink can be provided.

That is, there can be provided, through the means of the present invention, an active ray-curable inkjet ink in which the "coalescence of adjoining dots" can be suppressed stably (with satisfactory reproducibility) even in high speed recording, and which has no problem with ejection stability, has less foul odor and satisfactory UV curability, and has no problem of curing shrinkage. Furthermore, an image forming method using the active ray-curable inkjet ink can be provided.

BRIEF DESCRIPTION OF DRAWINGS

FIGS. 1A and 1B are diagrams illustrating an example of the configuration of the essential part of an inkjet recording apparatus.

DESCRIPTION OF EMBODIMENTS

The active ray-curable inkjet ink (hereinafter, also referred to as "inkjet ink", or simply as "ink") of the present invention contains a gelling agent, photopolymerizable compounds, and at photoinitiator, and preferably further contains a coloring material. The active ray-curable inkjet ink of the present invention undergoes reversible sol-gel phase transition depending on temperature, and satisfies all of the above-described items (1) to (3). This feature is a technical common to the inventions claimed in claim 1 to claim 5.

According to embodiments of the present invention, from the viewpoint of exhibiting the effect of the present invention, the (meth)acrylate compound having a C log P value in the range of 4.0 to 7.0 is preferably at least one (meth)acrylate compound between the items (4) and (5). Furthermore, the gelling agent is preferably at least one compound between the compounds represented by Formula (G1) and (G2).

The image forming method using the active ray-curable inkjet ink of the present invention is preferably an image forming method in which when the active ray-curable inkjet ink impacts on a recording material, the temperature of the recording material is adjusted to the range of (sol-gel phase transition temperature +−20° C.) to (sol-gel phase transition temperature +−10° C.) of the active ray-curable inkjet ink.

Hereinafter, the present invention, constituent elements thereof, and embodiments for carrying out the present invention will be described in detail. Meanwhile, in the present application, the term "~(to)" is used to mean that the numerical values described before and after the term are included in the range as the lower limit and the upper limit, respectively. Furthermore, the "(meth)acrylate compound" means a methacrylate or acrylate corn pound.

<Ink Composition>

The ink composition related to the active ray-curable inkjet ink of the present invention contains at least a gelling agent, photopolymerizable compounds, and a photoinitiator, and the ink composition preferably further contains a coloring material.

Furthermore, the active ray-curable inkjet ink undergoes reversible sol-gel phase transition depending on temperature, and satisfies all of the following requirements (1) to (3):

(1) the active ray-curable inkjet ink contains, as a first photopolymerizable compound, a (meth)acrylate compound having a molecular weight in the range of 300 to 1500 and having 3 to 14 unit structures represented by (—CH$_2$—CH$_2$—O—) in the molecule, in an amount in the range of 30% to 70% by mass relative to the total mass of the ink;

(2) the active ray-curable inkjet ink contains, as a second photopolymerizable compound, a (meth)acrylate compound having a molecular weight in the range of 300 to 1500 and having a C log P value in the range of 4.0 to 7.0, in an amount in the range of 10% to 40% by mass relative to the total mass of the ink; and (3) the gelling, agent has a total carbon number of 12 or greater and contains a linear or branched alkyl chain having 3 or more carbon atoms.

Here, the term "Log P value" is a coefficient indicating, the affinity of an organic compound to water and 1-octanol. Regarding the 1-octanol/water partition coefficient P, a partition equilibrium achieved when a trace amount of a compound is dissolved as a solute in a two-liquid phase solvent of 1-octanol and water, the partition coefficient P is the ratio of equilibrium concentrations of the compound in the respective solvents, and the partition coefficient is expressed as a logarithm Log P of the bottom 10. That is, the "log P value" is a logarithmic value of the partition coefficient of 1-octanol/water, and is known as an important parameter indicating the hydrophilicity and hydrophobicity of a molecule.

The "C Log P" is a Log P value obtained by calculation. The C Log P value can be calculated by a fragment method, an atomic approach method or the like. More specifically, in order to calculate the C log P value, the fragment method described in literatures (C. Hansch and A. Leo, "Substituent Constants for Correlation Analysis in Chemistry and Biology" (John Wiley & Sons, New York, 1969)), or commercially available software package 1 or 2 described below may be used:

Software package 1: MedChem Software (Release 3.54, August 1991, Medicinal Chemistry Project, Pomona College, Claremont, Calif.)

Software package 2: ChemDraw Ultra Ver. 8.0. (April 2003, CambridgeSoft Corporation, USA).

The numerical value of the C log P value described in the present specification or the like is a "C log P value" calculated using the software package 2.

In the following, various compounds and the like that constitute the active ray-curable inkjet ink of the present invention will be described in detail.

(Gelling Agent)

The gelling agent related to the present invention is a compound capable of reversibly gelling an ink composition.

A gel means a structure in which a material has lost mobility and has aggregated as a result of the interaction of a lamellar structure, a polymer network formed by non-covalent bonding or hydrogen bonding, a polymer network formed by a physical aggregation state, an aggregated structure of fine particles and the like; the interaction of precipitated fine crystals; or the like. Furthermore, gelling means that a material solidifies, semi-solidifies or thickens along with a rapid increase in viscosity or an increase in elasticity.

According to the present application, the phrase "undergoes reversible sol-gel phase transition depending on temperature" means that as a result of temperature change, transition (conversion) can occur, in a reversible manner, mutually between a sol state which has low viscosity and high fluidity and exhibits liquid properties, and a gel state which has high viscosity and exhibits solid or semi-solid properties.

Furthermore, the "sol-gel phase transition temperature" means the temperature at the conversion (transition) point at which a material changes (shifts) from a sol state to a gel state. This has the same meaning as the terms gel transition temperature, gel dissolution temperature, gel softening temperature, sol-gel transition point, and gelling point.

The sol-gel transition temperature related to the present invention is arbitrarily set, but from the viewpoints of stabilized discharge properties of the ink, adverse effects that accompany heating at a high temperature and the like, the sol-gel transition temperature is preferably in the range of 30° C. to 100° C. Furthermore, the sol-gel transition temperature is preferably between the ink temperature inside the inkjet recording head and the temperature of the recording material.

Regarding the method for measuring the sol-gel transition temperature, for example, a gel-like specimen is placed on a heating plate, the heating plate is heated, and the temperature at which the shape of the specimen is destroyed is measured. This temperature can be determined as the sol-gel phase transition temperature. Furthermore, the sol-gel transition temperature can be measured using a commercially available viscoelasticity measuring apparatus (for example, viscoelasticity measuring apparatus MCR300 manufactured by Physica Messtechnik GmbH).

The sol-gel transition temperature can be adjusted by the kind, amount of addition and the like of the (gelling agent, photopolymerizable compounds and the like that will be described below.

The requirement generally needed for gelation, that is, the structure required from a gelling agent, is to have a hydrophobic part (for example, an alkyl chain having 3 to 36 carbon atoms) and a hydrophilic part (for example, a polar group) together. When the temperature of the ink is lowered, and the molecular mobility of the polymerizable compounds that serve as solvents is decreased, the hydrophobic parts gather together surrounding the solvent under the action of intermolecular force, and the hydrophilic parts gather under the action of hydrogen bonding. Thereby, a gel is formed. Therefore, securement of compatibility between the polymerizable compounds as ink solvents and the gelling agent becomes important for stable ejection, or in order to suppress dot coalescence in a stable manner, without depending on the printing speed.

In conventional UV-curable inks using conventional gelling agents, this stability has been insufficient, or curability (resistance of the image film) has been insufficient because excessively large amounts of addition of the gelling agents have been used. The inventors of the present invention have found a system which can improve all of these problems. The system will be further described in the section for polymerizable compounds that will be described below.

Preferred examples of a compound capable of reversibly gelling an ink composition, which can be preferably used in the present invention, include low molecular weight compounds having molecular weights of less than 1000, such as fatty acid alcohols such as stearone (18-pentatriacontanone), 16-hentriacontanone, 2-tricosanone, and UNILIN425; fatty acid esters; inulin stearate-fatty acid dextrin (available from Chiba Flour Milling Co., Ltd. as RHEOPEARL series); L-glutamic acid derivatives (available from Ajinomoto Fine-Techno Co., Inc.); fatty acid amides (FATTY AMID series, available from Kao Corp.); glyceryl behenate/eicosanedioate (NOMCORT HK-G, Nisshin Oillio Group, Ltd.); jojoba ester (FLORAESTER 70, available from Ikeda Corp.); and the oil gelling agents described in Japanese Patent Application Laid-Open No. 2005-126507 or Japanese Patent Application Laid-Open No. 2005-255821. However, the compound is not intended to be limited to these.

Furthermore, examples of the fatty acid amides include FATTY AMID E: erucic acid amide, FATTY AMID T: oleic acid amide, FATTY AMID O-N: hardened beef tallow acid amide (all available from Ran Corp.), NIKKA AMIDE API: stearic acid amide (available from Nippon Kasei Chemical Co., Ltd.), and GP-1: N-lauroyl-L-glutamic acid dibutylamide (available from Ajinomoto Fine-Techno Co., Inc.).

In the present invention, from the viewpoint of the gelling ability, examples of gelling, agents that are particularly preferably used include compounds represented by the following Formulas (G1) and (G2):

$R_1$—CO—$R_2$        Formula (G1):

$R_3$—COO—$R_4$        Formula (G2):

wherein $R_1$ to $R_4$ each independently represent an alkyl chain having a straight-chained moiety having 3 to 36 carbon atoms, which may have a branch.

These gelling agents can suppress coalescence of dots more stably (with satisfactory reproducibility).

Meanwhile, fatty acid amide urethane compounds having a group with higher polarity, such as an amide group or a urethane group, as a linking portion; compounds in which an alkyl chain having 3 to 36 carbon atoms has a polar group such as —OH or —COOH at the end; and the like are satisfactorily used as gelling agents in preferred embodiments of known examples. However, the inventors of the present invention found that not only these compounds have poor stability in the ink in a heated state (precipitation or layer separation), but also elution of the gelling agent from the image film after UV-induced curing occurs slowly over time, causing a problem depending on the storage conditions for images.

More preferred examples of the gelling agent include the compounds described in the following Table 1, but the gelling agent is not limited thereto

TABLE 1

| Class | Structure | Name | Manufacturer |
|---|---|---|---|
| Ketone wax | Distearyl ketone | KAO WAX T1 | Kao Corp. |
|  |  | 18-Pentatriacontanone | Reagent (Arfa Aeser) |
|  | Dipalmityl ketone | Hentriacontan-16-on | Reagent (Arfa Aeser) |
|  | Dilauryl ketone | 12-tricosanone | Reagent (Arfa Aeser) |
| Fatty acid ester | Stearyl stearate | EXCEPARL SS | Kao Corp. |
|  |  | UNISTAR-M-9676 | NOF Corp. |
|  |  | EMALEX CC-18 | Nihon Emulsion Co., Ltd. |
|  |  | AMREPS SS | Kokyu Alcohol Kogyo Co., Ltd. |
|  | Cetyl palmitate | AMREPS PC | Kokyu Alcohol Kogyo Co., Ltd. |
|  | Behenyl behenate | UNISTAR M-2222SL | NOF Corp. |

When the gelling agent of the active ray-curable inkjet ink of the present invention is ejected from an inkjet recording head and then impacts on a recording material at a temperature lower than the gelling temperature, as the ink temperature decreases, the inkjet ink immediately enters into a gel state. As the inkjet ink enters into a gel state, mixing of dots and coalescence of dots are suppressed, and a high quality image can be formed in high speed printing. Thereafter, the inkjet ink is fixed onto the recording material by being cured by irradiation with an active ray, and a firm image film is formed.

The content of the gelling agent is preferably 2% to 10% by mass, and more preferably 3% to 7% by mass. If the content is less than 2% by mass, gel formation occurs insufficiently, and coalescence of dots cannot be completely suppressed. Furthermore, if the content is more than 10% by mass, curability after irradiation with an active ray is deteriorated, causing a problem.

(Polymerizable Compounds)

The inkjet ink of the present invention contains, as photopolymerizable compounds, (A) a (meth)acrylate compound having a molecular weight of 300 to 1500 and having 3 to 14 unit structures represented by formula: ($-CH_2-CH_2-O-$) in the molecule (hereinafter, also referred to as "polymerizable compound A"); and (B) a (meth)acrylate compound having a molecular weight of 300 to 1500 and a C log P value in the range of 4.0 to 7.0 (hereinafter, also referred to as "polymerizable compound B").

As described above, in the UV-curable inks that use conventional gelling agents, the compatibility between the gelling agent and the polymerizable compounds as solvents has not been investigated in detail, and although dot coalescence in the initial period of printing is suppressed, when printing is continued, dot coalescence becomes unstable, or any of the performances described above is deteriorated, so that a balance between the performances is not achieved. The inventors of the present invention newly found that in regard to an active ray-curable inkjet ink which uses the gelling agent described above, in order to satisfy all of satisfactory curability, absence of curing shrinkage (satisfactory resistance to folding), high image quality (suppression of dot coalescence and absence of printed letter collapse), and securement of reproducibility (dissolution stability of gelling agent=ejection stability), it is essential to use the polymerizable compound A and the polymerizable compound B in combination in the amounts in the mass range that will be described below.

It is preferable that the molecular weight of the polymerizable compounds be in the range of 300 to 1500. An ink composition containing polymerizable compounds having a molecular weight of less than 300 and a gelling agent undergoes an excessively large change in the viscosity of the ink below and above the ejection temperature. Therefore, it is difficult to maintain the temperature of the ink composition such that ejection from the inkjet head would be optimized. Furthermore, an ink composition containing polymerizable compounds having a molecular weight of greater than 1500 and a gelling agent has a high ink viscosity even after being converted to a sol, and therefore, the ink composition is not suitable as a composition for an inkjet ink. Furthermore, by selecting polymerizable compounds having a molecular weight of 300 or greater, the problem of the foul odor of the ink itself or the foul odor of the printed matter, which has been a problem in the conventional inks containing radical polymerizable compounds, can also be solved.

In regard to the polymerizable compound A, if the number of the unit structure represented by formula: ($-CH_2-CH_2-O-$) is less than 3, curing shrinkage becomes severe, and printed matters curl up. On the other hand, if the number of the unit structure is more than 14, the molecular weight becomes large, stable ejection cannot be achieved, and also solubility of the gelling agent also deteriorates, so that ejection becomes unstable.

The three to fourteen unit structures may be linked to each other, or may exist separately within the molecule of the polymerizable compound A. Whatsoever, it is desirable that the number of the unit structures represented by formula: ($-CH_2-CH_2-O-$) present in the molecule of the polymerizable compound A be 3 to 14.

The content of the polymerizable compound A is preferably in the range of 30% to 70% by mass of the total amount of the ink. If the content is less than 30% by mass, curing shrinkage becomes severe, the printed matters curl up, and when the image is bent, the image film is damaged. On the other hand, if the content is greater than 70% by mass, hydrophilicity of the ink as a whole increases, and as a result, a gelling agent that satisfies the requirement for gelling described above cannot be stably dissolved in the ink, while high quality images cannot be formed in a stable manner.

Examples of the (meth)acrylate compound for the polymerizable compound A include the following, but the (meth) acrylate compound is not intended to be limited to these.

4 EO-modified hexanediol diacrylate CD561 (molecular weight 358), 3 EO-modified trimethylolpropane triacrylate SR454 (molecular weight 429), 6 EO-modified trimethylolpropane triacrylate SR499 (molecular weight 560), and 4 EO-modified pentaerythritol tetraacrylate SR494 (molecular weight 528), all manufactured by Sartomer LLC; polyethylene glycol diacrylate NK ESTER A-400 (molecular weight 508), NK ESTER. A-600 (molecular weight 742), polyethylene glycol dimethacrylate NK. ESTER 9G (molecular weight 536), and NK ESTER 14G (molecular weight 770), all manufactured by Shin Nakamura Chemical Co., Ltd.; tetraethylene glycol diacrylate V#3351-IP (molecular weight 302) manufactured by Osaka Organic Chemical Industry, Ltd., trimethylolpropane EO-modified triacrylate MIRAMER M3160 (molecular weight 560), and pentaerythritol EO-modified tetraacrylate MIRAMER M4004 (molecular weight 572) manufactured by Miwon Commercial Co., Ltd.

In regard to the polymerizable compound B, when the compound is composed of a polymerizable compound having a C log P value of less than 4.0 only, the ink as a whole becomes hydrophilic as described above, and the solubility and stability of the gelling agent are adversely affected. Furthermore, when a polymerizable compound having a C log P of greater than 7.0 is used, the solubility and stability of they photoinitiator and initiator aids are adversely affected, which leads to defective curability and defective ejection.

The content of the polymerizable compound B is preferably in the range of 10% to 40% by mass of the total amount of the ink. If the content is less than 10% by mass, the ink as a whole becomes hydrophilic, and the solubility and stability of the gelling agent are adversely affected. If the content is greater than 40% by mass, curing shrinkage becomes severe, the printed matters curl up, and when the image is bent, the image film is damaged. Furthermore, the polymerizable compound B is preferably a trifunctional or higher-functional methacrylate or acrylate compound having 3 to 14 unit structures represented by formula: (—C(CH$_3$)H—CH$_2$—O—) in the molecule, or a bifunctional or higher-functional methacrylate or acrylate compound having a cyclic structure in the molecule, from the viewpoint of maintaining curability and the suppression of curing shrinkage. Furthermore, it is particularly preferable from the viewpoint that repeated reproducibility of gel formation is further enhanced.

The three to fourteen unit structures may be linked to one another, or may exist separately in the molecule of the polymerizable compound A. Whatsoever, it is desirable that the number of the unit structures represented by formula: (—C(CH$_3$)H—CH$_2$—O—) in the molecule of the polymerizable compound B be 3 to 14.

Examples of the (meth)acrylate compound for the polymerizable corn pound B include the following, but the (meth)acrylate compound is not intended to be limited to these.

3 PO-modified trimethylolpropane triacrylate PHOTOMER 4072 (molecular weight 471, C log P 4.90) manufactured by Cognis GmbH; 1,10-decanediol dimethacrylate NK ESTER DOD-N (molecular weight 310, C log P 5.75), tricyclodecanedimethanol diacrylate NK ester A-DCP (molecular weight 304, C log P 4.69), and tricyclodecanedimethanol dimethacrylate NK ESTER DCP (molecular weight 332, C log P 5.12), all manufactured by Shin Nakamura Chemical Co., Ltd.

Although the reason why the effect of the present invention is provided by using the active ray-curable inkjet ink of the present invention in the amount range described above, is not limited, for example, it may be contemplated as follows. That is, in the inkjet ink of the present invention, try the polymerizable compound A having relatively high hydrophilicity and the polymerizable compound B having relatively high hydrophobicity are mixed in a highly uniform state, and thus a gelling agent having a hydrophobic part and a hydrophilic part can exist stably while maintaining high uniformity in such a polymerizable composition. It is speculated that thereby, sol-gel conversion can be carried out stably and rapidly, and therefore, stable ejection of the ink can be achieved, while coalescence of the ink can be effectively inhibited.

Regarding the polymerizable compounds related to the present invention, the polymerizable compound A and the polymerizable compound B are used in combination, and all known (meth)acrylate monomers and/or oligomers can be used. The term "and/or" as used in the present invention means that the compound may be a monomer or may be an oligomer, and may also include both. Furthermore, the same also applies to the matters that will be described below.

Examples of monofunctional monomers include isoamyl acrylate, stearyl acrylate, lauryl acrylate, octyl acrylate, decyl acrylate, isomyristyl acrylate, isostearyl acrylate, 2-ethylhexyl diglycol acrylate, 2-hydroxybutyl acrylate, 2-acryloyloxyethyl hexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethylsuccinic acid, 2-acryloyloxyethylphthalic acid, 2-acryloyloxyethyl-2-hydroxyethylphthalic acid, lactone-modified flexible acrylate, and t-butylcyclohexyl acrylate.

Examples of bifunctional monomers include triethylene glycol diacrylate, tetraethylene glycol diacrylate, polyethylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethyloltricyclodecane diacrylate, PO adduct diacrylate of bisphenol A, hydroxypivalic acid neopentyl glycol diacrylate, and polytetramethylene glycol diacrylate.

Examples of polyfunctional monomers of trifunctionality or higher functionality include trimethylolpropane triacrylate, pentaerythritol triacrylate, pentaerythritol tetraacrylate, dipentaerythritol hexaacrylate, ditrimethylolpropane tetraacrylate, glycerin propoxytriacrylate, caprolactone-modified trimethylolpropane triacrylate, pentaerythritol ethoxytetraacrylate, and caprolactam-modified dipentaerythritol hexaacrylate.

In addition to these, polymerizable oligomers can also be incorporated, as in the case of monomers. Examples of polymerizable oligomers include epoxy acrylates, aliphatic urethane acrylates, aromatic urethane acrylates, polyester acrylates, and linear acrylic oligomers.

In addition, from the viewpoints of the sensitizing potential, skin irritation, eye irritation, mutagenicity, toxicity and the like, among the monomers described above, particularly isoamyl acrylate, stearyl acrylate, lauryl acrylate, octyl acrylate, decyl acrylate, isomyristyl acrylate, isostearyl acrylate, ethoxydiethylene glycol acrylate, methoxypolyethylene glycol acylate, methoxypropylene glycol acrylate, isobornyl acrylate, lactone-modified flexible acrylate, tetraethylene glycol diacrylate, polyethylene glycol diacrylate, polypropylene glycol diacrylate, dipentaerythritol hexaacrylate, ditrimethylolpropane tetraacrylate, glycerin propoxytriacrylate, cauprolactone-modified trimethylolpropane triacrylate, pentaerythritol ethoxytetracrylate, and caprolactam-modified dipentaerythritol hexaacrylate are preferred.

Furthermore, even among these, stearyl acrylate, lauryl acrylate, isostearyl acrylate, ethoxydiethylene glycol acrylate, isobornyl acrylate, tetraethylene glycol diacrylate, glycerin propoxytriacrylate, cauprolactone-modified trimethylolpropane triacrylate, and caprolactam-modified dipentaerythritol hexaacrylate are particularly preferred.

(Photoinitiator)

The photo initiator related to the present invention is a compound capable of initiating polymerization of a polymerizable compound by means of light. Examples of the photoinitiator that can be used include all known photoradical initiators listed in "Application and Market of UV-EB Curing Technologies" (CMC Publishing Inc., reviewed by Yoneno Tabata/edited by RadTech Japan), and the like. For example, conventionally known photoradical generators such as aryl alkyl ketones, oxime ketones, S-phenyl thiobenzoate, titanocene, aromatic ketones, thioxanthone, benzyl and quinone derivatives, and ketocoumarins can be used.

Among them, acylphosphine oxides and acyl phosphonates can be preferably used from the viewpoint of sensitivity.

Specifically, bis(2,4,6-trimethylbenzoyl)phenylphosphine oxide, bis(2,6-dimethoxybenzoyl)-2,4,4-trimethylpentylphosphine oxide, and the like are preferred.

The content of the photoinitiator is preferably in the range of 1% to 10% by mass, and more preferably in the range of 2% to 8% by mass, relative to the total amount of the ink composition.

(Coloring Material)

The coloring material that can be used in the active ray-curable inkjet ink of the present invention preferably contains various known dyes and/or pigments, and particularly preferably contains pigments.

Pigments that can be preferably used in the present invention will be listed below.

C.I. Pigment Yellow 1, 2, 3, 12, 13, 14, 16, 17, 73, 74, 75, 81, 83, 87, 93, 95, 97, 98, 109, 114, 120, 128, 129, 138, 150, 151, 154, 155, 180, 185, and 213;

C.I. Pigment Red 5, 7, 12, 22, 38, 48:1, 48:2, 48:4, 49:1, 53:1, 57.1, 63:1, 101, 112, 122, 123, 144, 146, 168, 184, 185, and 202;

C.I. Pigment Violet 19 and 23;

C.I. Pigment Blue 1, 2, 3, 15:1, 15:2, 15:3, 15:4, 18, 22, 27, 29, and 60;

C.I. Pigment Green 7 and 36;

C.I. Pigment White 6, 18, and 21; and

C.I. Pigment Black 7.

For the dispersion of the pigments described above, for example, a ball mill, a sand mill, an attriter, a roll mill, an agitator, a Henschel mixer, a colloid mill, an ultrasonic homogenizer, a pearl mill, a wet jet mill, and a paint shaker can be used.

Furthermore, when dispersion of the pigment is carried out, a dispersant may be added to the system. Regarding examples of the dispersant, it is preferable to use a polymeric dispersant, and examples of the polymeric dispersant include SOLSPERSE series of Avecia Biotechnology, Inc., and PB series of Ajinomoto Fine-Techno Co., Inc.

Furthermore, synergists corresponding to the various pigments can also be used as dispersing aids. These dispersants and dispersing aids are preferably added in an amount of 1 part to 50 parts by mass relative to 100 parts by mass of the pigment. Regarding the dispersing medium, dispersion is carried out using a solvent or a polymerizable compound, but the irradiated radiation-curable ink used in the present invention is preferably solvent-free, in order to induce reaction and curing immediately after the impact of the ink. If the solvent remains on a cured image, there may be problems of deterioration of solvent resistance, and the VOC of remaining solvent. Therefore, for the dispersing medium, it is preferable to select not a solvent, but a polymerizable compound, among others, a monomer having the lowest viscosity, in view of adaptability to dispersion.

In regard to the dispersion of the pigment, it is preferable to adjust the average particle size of the pigment particles to 0.08 µm to 0.2 µm, and the maximum particle size is 0.3 µm to 10 µm, and preferably 0.3 µm to 3 µm. In order to carry out adjustment of the average particle size of the pigment, the selection, dispersing; conditions and filtering conditions for the pigment, dispersant and dispersing medium are appropriately set up. Through this management of the particle size, clogging of the head nozzle is suppressed, and storage stability of the ink, ink transparency, and curing sensitivity can be maintained.

Furthermore, the active ray-curable inkjet ink of the present invention can use conventionally known dyes, and preferably oil-soluble dyes, as necessary. Examples of the oil-soluble dyes that can be used in the present invention include the following, but the oil-soluble dyes are not intended to be limited to these.

(Magenta Dyes)

MS Magenta VP, MS Magenta HM-1450, MS Magenta HSo-147 (all manufactured by Mitsui Toatsu Chemicals, Inc.), AIZENSOT Red-1, AIZEN SOT Red-2, AIZEN SOTRed-3, AIZEN SOT Pink-1, SPIRON Red GEH SPECIAL (all manufactured by Hodogaya Chemical Co., Ltd.), RESOLIN Red FB 200%, MACROLEX Red Violet R, MACROLEX ROT5B (all manufactured by Bayer Japan, Ltd.), KAYASET Red B, KAYASET Red 130, KAYASET Red 802 (all manufactured by Nippon Kayaku Co., Ltd.), PHLOXIN, ROSE BENGAL, ACID Red (all manufactured by Daiwa Kasei Ltd.), HSR-31, DIARESIN Red K (all manufactured by Mitsubishi Kasei Corp.), and Oil Red (manufactured by BASF Japan, Ltd.).

(Cyan Dyes)

MS Cyan HM-1238, MS Cyan HSo-16, Cyan HSo-144, MS Cyan VPG (all manufactured by Mitsui Toatsu Chemicals, Inc.), AIZEN SOT Blue-4 (manufactured by Hodogaya Chemical Co., Ltd.), RESOLIN Blue BGLN 200%, MACROLEX Blue RR, CLEFS Blue GN, SIRIUS SUPRA TURQ, Blue Z-BGL, SIRIUS SUPRA TURQ, Blue FB-LL 330% (all manufactured by Bayer Japan, Ltd.), KAYASET Blue FR, KAYASET Blue N, KAYASET Blue 814, Turq. Blue GL-5 200, Light Blue BGL-5 200 (all manufactured by Nippon Kayaku Co., Ltd.), DAIWA Blue 7000, Oleosol Fast Blue GL (all manufactured by Daiwa Kasei Co., Ltd.), DIARESIN Blue P (manufactured by Mitsubishi Kasei Corp.), SUDAN Blue 670, NEOPEN Blue 808, and ZAPON Blue 806 (all manufactured by BASF Japan, Ltd.).

(Yellow Dyes)

MS Yellow HSm-41, Yellow KX-7, Yellow EX-27 (all manufactured by Mitsui Toatsu Chemicals, Inc.), AIZEN SOT Yellow-1, AIZEN SOT YelloW-3, AIZEN SOT Yellow-6 all manufactured by Hodogaya Chemical Co., Ltd.), MACROLEX Yellow 6G, MACROLEX FLUOR, Yellow 10GN (all manufactured by Bayer Japan, Ltd.), KAYASET Yellow SF-G, KAYASET Yellow 2G, KAYASET Yellow A-G, KAYASET Yellow E-G (all manufactured by Nippon Kayaku Co., Ltd.), DAIWA Yellow 330 HB (all manufactured by Daiwa Kasei Co., Ltd.), HSY-68 (manufactured by Mitsubishi Kasei Corp.), SUDAN Yellow 146, and NEOPEN Yellow 075 (all manufactured by BASF Japan, Ltd.), (Black Dyes)

MS Black VPC (manufactured by Mitsui Toatsu Chemicals, AIZEN SOT Black-1, AIZEN SOT Black-5 (all manufactured by Hodogaya Chemical Co., Ltd.), RESORIN Black GSN 200%, RESOLIN Black BS (all manufactured by Bayer Japan, Ltd.), LAVA SET Black A-N (all manufactured by Nippon Kayaku Co., Ltd.), DAIWA Black MSC (all manufactured by Daiwa Kasei Co., Ltd.), HSB-202 (manufactured by Mitsubishi Kasei Corp.), NEPTUNE Black X60, and NEOPEN Black X58 (all manufactured by BASF Japan, Ltd.), When the ink composition related to the present invention contains a coloring material, the concentration of the coloring material is preferably in the range of 1% by mass to 10% by mass relative to the total amount of the ink composition. When the concentration is 1% by mass or more, satisfactory image quality can be obtained, and when the concentration is 10% by mass or less, an ink viscosity appropriate for ink discharge can be obtained. Furthermore, two or more kinds of colorants can be appropriately mixed and used for color adjustment or the like.

(Recording Material)

The recording material may be paper, or may be a resin film. Examples of the paper include coated paper for printing, coated paper B for printing, and high quality paper. Furthermore, examples of the resin film include a polyethylene terephthalate film and a vinyl chloride film.

In the present invention, it is preferable that leveling between adjoining dots occur appropriately to the extent that adjoining dots are not mingled together. The reason is that surface asperities occur at the surface of image films, and image gloss is decreased. The inventors of the present invention found that such image gloss can be adjusted irrespective of the kind of the gelling agent, by adjusting the temperature of the recording material at the time when the ink impacts on the recording material, to the range of (sol-gel phase transition temperature +−20° C.) (sol-gel phase transition temperature +−10° C.) of the ink.

In order to carry out this image gloss adjustment by temperature regulation, it is necessary that the gelling agent exist stably in the polymerizable compounds that are solvents, and the constitution of the present invention is particularly preferred in this point of view.

(Conditions for Ejection of Ink)

In regard to the conditions for ejection of the ink of the present invention, it is preferable to heat the inkjet recording head, the ink flow channel, and the ink to 80° C. to 120° C. and eject the ink, from the viewpoint of ejection stability.

In order to eject the ink stably from the inkjet recording head, the ink viscosity at the ejection temperature is necessarily adjusted to 7 mPa·s to 14 mPa·s.

(Image Forming Method)

The image forming method of the present invention is such that regarding the conditions for irradiation of an active ray, the active ray is preferably irradiated within 0.001 seconds to 1.0 second, and more preferably 0.001 seconds to 0.5 seconds, after the impact of the ink.

An image forming method of line recording mode, in which the constitution of the present invention is more effective, will be described.

FIG. 1 illustrates an example of the configuration of the essential part of an inkjet recording apparatus. FIG. 1A is a lateral view, and FIG. 1B is a top view.

The inkjet recording apparatus illustrated in FIG. 1 is referred to as line recording mode, in which inkjet recording heads 3 for each color ink are disposed on a head carriage 2 such that the inkjet recording heads cover the entire width of the recording material, and plural head carriages are disposed and fixed. An image is formed when a recording material is conveyed beneath these fixed head carriages 2.

The conveyance speed of the recording material is preferably 30 m/s to 120 m/s. As the conveyance speed is faster, the rate of image formation becomes faster, which is preferable. However, if the conveyance speed is too fast, the image quality is deteriorated, or photocuring (will be described below) of the ink becomes insufficient.

The number of the inkjet recording heads 3 that are used for each color in the conveyance direction of the recording material, varies depending on the nozzle density of the head used and the resolution at the time of printing. For example, in the ease where it is wished to form an image at a resolution of 1440 dpi using a head with a droplet amount of 2 pl and a nozzle density of 360 dpi, an image of 1440×1440 dpi can be formed by disposing four inkjet recording heads 3 in a shifted manner in the conveyance direction of the recording material.

In the case where it is it wished to form an image at a resolution of 720×720 dpi using a head with a droplet amount of 6 pl and a nozzle density of 360 dpi, an image of 720 dpi can be formed by disposing two inkjet recording heads 3 in a shifted manner. The term dpi as used in the present invention means the number of dots per 2.54 cm.

On the downstream side of the head carriages 2, a metal halide lamp or LED 1 is disposed so as to cover the entire width of the recording material. After the ink impacts on the recording material, ultraviolet radiation is rapidly irradiated by the lamp, and thus an image is completely fixed.

The light source used for the irradiation after image formation is preferably a light source capable of emitting UV light at a high illuminance such as an illuminance of 100 mW/cm$^2$ or higher, such as a high pressure mercury lamp, a metal halide lamp or an LED. Among them, an LED that consumes less electric power is preferred, but there are no limitations thereon.

Meanwhile, regarding LED 1 in FIG. 1, for example, a water cooled LED at 395 nm manufactured by Phoseon Technology, Inc. is used.

According to the present invention, it is preferable to form an image by ejecting small liquid droplets at a droplet amount of 0.5 pl to 2.5 pl. When the droplet amount is adjusted to the range described above, high precision images can be formed, and the problem of the surface asperities of the image film as described above is also alleviated. However, in the ease of ejecting small droplets in a droplet amount in the range described above, stable image formation is not achieved if the ink stability is not satisfactory. From that point of view, the constitution of the present invention provides excellent ink stability, does not cause a problem even if the ink is ejected as small liquid droplets in a droplet amount of 0.5 pl to 2.5 pl, and can form high precision images in a stable manner.

Examples

Hereinafter, the present invention will be specifically described by way of Examples, but the embodiments of the present invention are not intended to be limited to these examples.

<<Preparation of Pigment Dispersion Liquid>>

Pigments were dispersed by the following procedure. The following two compounds were introduced into a stainless steel beaker, and while the compounds were heated on a hot plate at 65° C., the compounds were heated and stirred to melt for one hour.

| | |
|---|---|
| AJISPER PB824 | 9 parts by mass |
| Tripropylene glycol diacrylate (APG-200, manufactured by Shin Nakamura Chemical Co., Ltd.) | 71 parts by mass |

Meanwhile, preparation of the pigment dispersion liquid of the following ink composition 8 was carried out using CD561 (manufactured by Sartomer LLC), which is an acrylate monomer corresponding to the polymerizable compound A, instead of APG-200.

The mixture was cooled to room temperature, and then 20 parts by mass of the pigment described below was added to this mixture. The resulting mixture was introduced into a glass bottle together with 200 g of zirconia beads having a diameter of 0.5 mm, and tightly sealed. The mixture was subjected to a dispersion treatment in a paint shaker for the duration described below, and then the zirconia beads were removed.

| Pigment dispersion liquid 1: Pigment Black 7 (manufactured by Mitsubishi Chemical Corp., #52) | 5 hours |
|---|---|
| Pigment dispersion liquid 2: Pigment Blue 15:4 (manufactured by Dainichiseika Color & Chemicals Manufacturing Co., Ltd., Chromofine Blue 6332JC) | 5 hours |
| Pigment dispersion liquid 3: Pigment Yellow 150 (manufactured by Lanxess AG, E4GN-GT CH20015) | 8 hours |
| Pigment dispersion liquid 4: Pigment Red 122 (manufactured by Dainichiseika Color & Chemicals Manufacturing Co., Ltd., Chromofine Red 6112JC) | 8 hours |

<<Preparation of Ink Composition>>

Inks were prepared based on the ink compositions described in Tables 2 to 30 and the combinations with the gelling agents described in Table 1, and thus ink compositions 3 to 31 were prepared. Thereafter, the ink compositions thus prepared were filtered with a 3-μm TEFLON (registered trademark) membrane filter manufactured by Advantec MFS, Inc.

Meanwhile, ink composition 1 (comparative ink) used an ink for Phaser 860 manufactured by Xerox Corp.; ink composition 2 used an ultraviolet-curable ink that did not contain a gelling agent, or an ultraviolet-curable ink obtained by incorporating a gelling agent to the ink of Example Prescription 1 of U.S. Pat. No. 7,423,072 B2 (the amount of addition of tetrahydrofurfuryl acrylate was reduced by 5%, and 3% of stearyl stearate and 2% of distearyl ketone were added instead thereof).

The sol-gel phase transition temperatures of the various inks were as indicated in the table. Meanwhile, the sol-gel phase transition temperature was measured with a viscoelasticity measuring apparatus MCR300 manufactured by Physica Messtechnik GmbH at a shear rate of 11 (1/s).

TABLE 2

| | Ink composition 3 | | | | |
|---|---|---|---|---|---|
| | | K | C | M | Y |
| Pigment dispersion liquid | 1 | 12.5 | | | |
| | 2 | | 12.5 | | |
| | 4 | | | 21.0 | |
| | 3 | | | | 15.0 |
| Polymerizable compound (A) | NK ESTER A-400 (manufactured by Shin Nakamura Chemical Co., Ltd.) | 28.5 | 28.5 | 20.0 | 26.0 |
| Polymerizable compound (A) | SR499 (manufactured by Sartomer LLC) | 20.0 | 20.0 | 20.0 | 20.0 |
| Polymerizable compound (A) | SR494 (manufactured by Sartomer LLC) | 15.0 | 15.0 | 15.0 | 15.0 |
| Polymerizable compound | SR9003 (manufactured by Sartomer LLC) | 10.0 | 10.0 | 10.0 | 10.0 |
| Gelling agent | Stearyl stearate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

Remarks:
ClogP 4.0-7.0 acrylate is absent

TABLE 3

| | Ink composition 4 | | | | |
|---|---|---|---|---|---|
| | | K | C | M | Y |
| Pigment dispersion liquid | 1 | 12.5 | | | |
| | 2 | | 12.5 | | |
| | 4 | | | 21.0 | |
| | 3 | | | | 15.0 |
| Polymerizable compound (A) | NK ESTER A-400 (manufactured by Shin Nakamura Chemical Co., Ltd.) | 30.5 | 30.5 | 22.0 | 28.0 |
| Polymerizable compound (A) | SR499 (manufactured by Sartomer LLC) | 20.0 | 20.0 | 20.0 | 20.0 |
| Polymerizable compound (A) | SR494 (manufactured by Sartomer LLC) | 15.0 | 15.0 | 15.0 | 15.0 |
| Polymerizable compound (B) | Photomer 4072 (manufactured by Cognis Corp.) | 8.0 | 8.0 | 8.0 | 8.0 |
| Gelling agent | Stearyl stearate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

Remarks:
ClogP 4.0-7.0 acrylate 8%

TABLE 4

| | Ink composition 5 | | | | |
|---|---|---|---|---|---|
| | | K | C | M | Y |
| Pigment dispersion liquid | 1 | 12.5 | | | |
| | 2 | | 12.5 | | |
| | 4 | | | 21.0 | |
| | 3 | | | | 15.0 |
| Polymerizable compound (A) | CD561 (manufactured by Sartomer LLC) | 13.5 | 13.5 | 5.0 | 11.0 |
| Polymerizable compound (A) | SR499 (manufactured by Sartomer LLC) | 10.0 | 10.0 | 10.0 | 10.0 |
| Polymerizable compound (A) | SR494 (manufactured by Sartomer LLC) | 5.0 | 5.0 | 5.0 | 5.0 |
| Polymerizable compound (B) | Photomer 4072 (manufactured by Cognis Corp.) | 45.0 | 45.0 | 45.0 | 45.0 |
| Gelling agent | Stearyl stearate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

Remarks:
ClogP 4.0-7.0 acrylate 45%

TABLE 5

| | Ink composition 6 | | | | |
|---|---|---|---|---|---|
| | | K | C | M | Y |
| Pigment dispersion liquid | 1 | 12.5 | | | |
| | 2 | | 12.5 | | |
| | 4 | | | 21.0 | |
| | 3 | | | | 15.0 |
| Polymerizable compound (A) | CD561 (manufactured by Sartomer LLC) | 8.5 | 8.5 | 0.0 | 6.0 |
| Polymerizable compound (A) | SR494 (manufactured by Sartomer LLC) | 5.0 | 5.0 | 5.0 | 5.0 |
| Polymerizable | Photomer 4072 | 60.0 | 60.0 | 60.0 | 60.0 |

TABLE 5-continued

Ink composition 6

| | | K | C | M | Y |
|---|---|---|---|---|---|
| compound (B) | (manufactured by Cognis Corp.) | | | | |
| Gelling agent | Stearyl stearate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

Remarks:
ClogP 4.0-7.0 acrylate 60%

TABLE 6

Ink composition 7

| | | K | C | M | Y |
|---|---|---|---|---|---|
| Pigment dispersion liquid | 1 | 12.5 | | | |
| | 2 | | 12.5 | | |
| | 4 | | | 21.0 | |
| | 3 | | | | 15.0 |
| Polymerizable compound | SR9003 (manufactured by Sartomer LLC) | 33.5 | 33.5 | 25.0 | 31.0 |
| Polymerizable compound (A) | CD561 (manufactured by Sartomer LLC) | 15.0 | 15.0 | 15.0 | 15.0 |
| Polymerizable compound (A) | SR494 (manufactured by Sartomer LLC) | 5.0 | 5.0 | 5.0 | 5.0 |
| Polymerizable compound (B) | Photomer 4072 (manufactured by Cognis Corp.) | 20.0 | 20.0 | 20.0 | 20.0 |
| Gelling agent | Stearyl stearate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

Remarks:
EO-modified acrylate 20%,
ClogP 4.0-7.0 acrylate 10-40%

TABLE 7

Ink composition 8

| | | K | C | M | Y |
|---|---|---|---|---|---|
| Pigment dispersion liquid | 1 | 12.5 | | | |
| | 2 | | 12.5 | | |
| | 4 | | | 21.0 | |
| | 3 | | | | 15.0 |
| Polymerizable compound (A) | CD561 (manufactured by Sartomer LLC) | 44.5 | 44.5 | 36.0 | 42.0 |
| Polymerizable compound (A) | SR499 (manufactured by Sartomer LLC) | 15.0 | 15.0 | 15.0 | 15.0 |
| Polymerizable compound (A) | SR494 (manufactured by Sartomer LLC) | 5.0 | 5.0 | 5.0 | 5.0 |
| Polymerizable compound (B) | Photomer 4072 (manufactured by Cognis Corp.) | 11.0 | 11.0 | 11.0 | 11.0 |
| Gelling agent | Stearyl stearate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 4.0 | 4.0 | 4.0 | 4.0 |
| Photoinitiator | ITX (DKSH) | 1.5 | 1.5 | 1.5 | 1.5 |
| Sensitizing aid | Kayacure EPA (Nippon Kayaku Co., Ltd.) | 1.5 | 1.5 | 1.5 | 1.5 |

Remarks:
Dispersed in CD561 instead of APG-200.
EO-modified acrylate 70%,
ClogP 4.0-7.0 acrylate 10-40%

TABLE 8

Ink composition 9

| | | K | C | M | Y |
|---|---|---|---|---|---|
| Pigment dispersion liquid | 1 | 12.5 | | | |
| | 2 | | 12.5 | | |
| | 4 | | | 21.0 | |
| | 3 | | | | 15.0 |
| Polymerizable compound (A) | NK ESTER A-400 (manufactured by Shin Nakamura Chemical Co., Ltd.) | 42.5 | 42.5 | 34.0 | 40.0 |
| Polymerizable compound (A) | SR499 (manufactured by Sartomer LLC) | 10.0 | 10.0 | 10.0 | 10.0 |
| Polymerizable compound (A) | SR494 (manufactured by Sartomer LLC) | 5.0 | 5.0 | 5.0 | 5.0 |
| Polymerizable compound (B) | Photomer 4072 (manufactured by Cognis Corp.) | 20.0 | 20.0 | 20.0 | 20.0 |
| Gelling agent | Distearyl Ketone 1% | 1.0 | 1.0 | 1.0 | 1.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

Remarks:
Gelling agent 1%

TABLE 9

Ink composition 10

| | | K | C | M | Y |
|---|---|---|---|---|---|
| Pigment dispersion liquid | 1 | 12.5 | | | |
| | 2 | | 12.5 | | |
| | 4 | | | 21.0 | |
| | 3 | | | | 15.0 |
| Polymerizable compound (A) | NK ESTER A-400 (manufactured by Shin Nakamura Chemical Co., Ltd.) | 28.5 | 28.5 | 20.0 | 26.0 |
| Polymerizable compound (A) | SR499 (manufactured by Sartomer LLC) | 10.0 | 10.0 | 10.0 | 10.0 |
| Polymerizable compound (A) | SR494 (manufactured by Sartomer LLC) | 5.0 | 5.0 | 5.0 | 5.0 |
| Polymerizable compound (B) | Photomer 4072 (manufactured by Cognis Corp.) | 20.0 | 20.0 | 20.0 | 20.0 |
| Gelling agent | Stearyl stearate 10%, distearyl ketone 5% | 15.0 | 15.0 | 15.0 | 15.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

Remarks:
Gelling agent 15%

TABLE 10

Ink composition 11

| | | K | C | M | Y |
|---|---|---|---|---|---|
| Pigment dispersion liquid | 1 | 12.5 | | | |
| | 2 | | 12.5 | | |
| | 4 | | | 21.0 | |
| | 3 | | | | 15.0 |
| Polymerizable compound (A) | CD561 (manufactured by Sartomer LLC) | 38.5 | 38.5 | 30.0 | 36.0 |
| Polymerizable compound (A) | SR499 (manufactured by Sartomer LLC) | 10.0 | 10.0 | 10.0 | 10.0 |
| Polymerizable compound (A) | SR494 (manufactured by Sartomer LLC) | 5.0 | 5.0 | 5.0 | 5.0 |
| Polymerizable compound (B) | NK ESTER DOD-N (manufactured by Shin Nakamura Chemical Co., Ltd.) | 20.0 | 20.0 | 20.0 | 20.0 |
| Gelling agent | Stearyl stearate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 11

Ink composition 12

| | | K | C | M | Y |
|---|---|---|---|---|---|
| Pigment dispersion liquid | 1 | 12.5 | | | |
| | 2 | | 12.5 | | |
| | 4 | | | 21.0 | |
| | 3 | | | | 15.0 |
| Polymerizable compound (A) | CD561 (manufactured by Sartomer LLC) | 28.5 | 28.5 | 20.0 | 26.0 |
| Polymerizable compound (A) | SR499 (manufactured by Sartomer LLC) | 15.0 | 15.0 | 15.0 | 15.0 |
| Polymerizable compound (A) | SR494 (manufactured by Sartomer LLC) | 10.0 | 10.0 | 10.0 | 10.0 |
| Polymerizable compound (B) | Photomer 4072 (manufactured by Cognis Corp.) | 20.0 | 20.0 | 20.0 | 20.0 |
| Gelling agent | Stearyl stearate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 12

Ink composition 13

| | | K | C | M | Y |
|---|---|---|---|---|---|
| Pigment dispersion liquid | 1 | 12.5 | | | |
| | 2 | | 12.5 | | |
| | 4 | | | 21.0 | |
| | 3 | | | | 15.0 |
| Polymerizable compound (A) | CD561 (manufactured by Sartomer LLC) | 33.5 | 33.5 | 25.0 | 31.0 |
| Polymerizable compound (A) | SR499 (manufactured by Sartomer LLC) | 15.0 | 15.0 | 15.0 | 15.0 |
| Polymerizable compound (A) | SR494 (manufactured by Sartomer LLC) | 5.0 | 5.0 | 5.0 | 5.0 |
| Polymerizable compound (B) | NK ESTER A-DCP (manufactured by Shin Nakamura Chemical Co., Ltd.) | 20.0 | 20.0 | 20.0 | 20.0 |
| Gelling agent | Stearyl stearate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 13

Ink composition 14

| | | K | C | M | Y |
|---|---|---|---|---|---|
| Pigment dispersion liquid | 1 | 12.5 | | | |
| | 2 | | 12.5 | | |
| | 4 | | | 21.0 | |
| | 3 | | | | 15.0 |
| Polymerizable compound (A) | CD561 (manufactured by Sartomer LLC) | 38.5 | 38.5 | 30.0 | 36.0 |
| Polymerizable compound (A) | SR499 (manufactured by Sartomer LLC) | 10.0 | 10.0 | 10.0 | 10.0 |
| Polymerizable compound (A) | SR494 (manufactured by Sartomer LLC) | 5.0 | 5.0 | 5.0 | 5.0 |
| Polymerizable compound (B) | NK ESTER DCP (manufactured by Shin Nakamura Chemical Co., Ltd.) | 20.0 | 20.0 | 20.0 | 20.0 |
| Gelling agent | Stearyl stearate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 14

Ink composition 15

| | | K | C | M | Y |
|---|---|---|---|---|---|
| Pigment dispersion liquid | 1 | 12.5 | | | |
| | 2 | | 12.5 | | |
| | 4 | | | 21.0 | |
| | 3 | | | | 15.0 |
| Polymerizable compound (A) | CD561 (manufactured by Sartomer LLC) | 38.5 | 38.5 | 30.0 | 36.0 |
| Polymerizable compound (A) | SR499 (manufactured by Sartomer LLC) | 10.0 | 10.0 | 10.0 | 10.0 |
| Polymerizable compound (A) | SR494 (manufactured by Sartomer LLC) | 5.0 | 5.0 | 5.0 | 5.0 |
| Polymerizable compound (B) | Photomer 4072 (manufactured by Cognis Corp.) | 10.0 | 10.0 | 10.0 | 10.0 |
| Polymerizable compound (B) | NK ESTER A-DCP (manufactured by Shin Nakamura Chemical Co., Ltd.) | 10.0 | 10.0 | 10.0 | 10.0 |
| Gelling agent | Stearyl stearate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 15

Ink composition 16

|  |  | K | C | M | Y |
|---|---|---|---|---|---|
| Pigment dispersion liquid | 1 | 12.5 | | | |
|  | 2 | | 12.5 | | |
|  | 4 | | | 21.0 | |
|  | 3 | | | | 15.0 |
| Polymerizable compound (A) | NK ESTER A-400 (manufactured by Shin Nakamura Chemical Co., Ltd.) | 28.5 | 28.5 | 20.0 | 26.0 |
| Polymerizable compound (A) | SR499 (manufactured by Sartomer LLC) | 15.0 | 15.0 | 15.0 | 15.0 |
| Polymerizable compound (A) | SR494 (manufactured by Sartomer LLC) | 10.0 | 10.0 | 10.0 | 10.0 |
| Polymerizable compound (B) | Photomer 4072 (manufactured by Cognis Corp.) | 20.0 | 20.0 | 20.0 | 20.0 |
| Gelling agent | Stearyl stearate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 16

Ink composition 17

|  |  | K | C | M | Y |
|---|---|---|---|---|---|
| Pigment dispersion liquid | 1 | 12.5 | | | |
|  | 2 | | 12.5 | | |
|  | 4 | | | 21.0 | |
|  | 3 | | | | 15.0 |
| Polymerizable compound (A) | CD561 (manufactured by Sartomer LLC) | 28.5 | 28.5 | 20.0 | 26.0 |
| Polymerizable compound (A) | SR454 (manufactured by Sartomer LLC) | 15.0 | 15.0 | 15.0 | 15.0 |
| Polymerizable compound (A) | SR494 (manufactured by Sartomer LLC) | 10.0 | 10.0 | 10.0 | 10.0 |
| Polymerizable compound (B) | Photomer 4072 (manufactured by Cognis Corp.) | 20.0 | 20.0 | 20.0 | 20.0 |
| Gelling agent | Stearyl stearate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 17

Ink composition 18

|  |  | K | C | M | Y |
|---|---|---|---|---|---|
| Pigment dispersion liquid | 1 | 12.5 | | | |
|  | 2 | | 12.5 | | |
|  | 4 | | | 21.0 | |
|  | 5 | | | | 15.0 |
| Polymerizable compound (A) | NK ESTER A-400 (manufactured by Shin Nakamura Chemical Co., Ltd.) | 28.5 | 28.5 | 20.0 | 26.0 |
| Polymerizable compound (A) | Miramer M3160 (manufactured by Miwon Commercial Co., Ltd.) | 15.0 | 15.0 | 15.0 | 15.0 |
| Polymerizable compound (A) | Miramer M4004 (manufactured by Miwon Commercial Co., Ltd.) | 10.0 | 10.0 | 10.0 | 10.0 |
| Polymerizable compound (B) | Photomer 4072 (manufactured by Cognis Corp.) | 20.0 | 20.0 | 20.0 | 20.0 |
| Gelling agent | Stearyl stearate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 18

Ink composition 19

|  |  | K | C | M | Y |
|---|---|---|---|---|---|
| Pigment dispersion liquid | 1 | 12.5 | | | |
|  | 2 | | 12.5 | | |
|  | 4 | | | 21.0 | |
|  | 3 | | | | 15.0 |
| Polymerizable compound (A) | NK ESTER A-400 (manufactured by Shin Nakamura Chemical Co., Ltd.) | 31.5 | 31.5 | 23.0 | 29.0 |
| Polymerizable compound (A) | SR499 (manufactured by Sartomer LLC) | 15.0 | 15.0 | 15.0 | 15.0 |
| Polymerizable compound (A) | SR494 (manufactured by Sartomer LLC) | 5.0 | 5.0 | 5.0 | 5.0 |
| Polymerizable compound (B) | NK ESTER A-DCP (manufactured by Shin Nakamura Chemical Co., Ltd.) | 22.0 | 22.0 | 22.0 | 22.0 |
| Gelling agent | Stearyl stearate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 19

Ink composition 20

|  |  | K | C | M | Y |
|---|---|---|---|---|---|
| Pigment dispersion liquid | 1 | 12.5 | | | |
|  | 2 | | 12.5 | | |
|  | 4 | | | 21.0 | |
|  | 3 | | | | 15.0 |
| Polymerizable compound (A) | CD561 (manufactured by Sartomer LLC) | 31.5 | 31.5 | 23.0 | 29.0 |
| Polymerizable compound (A) | SR454 (manufactured by Sartomer LLC) | 15.0 | 15.0 | 15.0 | 15.0 |
| Polymerizable compound (A) | SR494 (manufactured by Sartomer LLC) | 5.0 | 5.0 | 5.0 | 5.0 |
| Polymerizable compound (B) | NK ESTER A-DCP (manufactured by Shin Nakamura Chemical Co., Ltd.) | 22.0 | 22.0 | 22.0 | 22.0 |
| Gelling agent | Stearyl stearate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon | 2.0 | 2.0 | 2.0 | 2.0 |

TABLE 19-continued

Ink composition 20

|  |  | K | C | M | Y |
|---|---|---|---|---|---|
|  | Kayaku Co., Ltd.) |  |  |  |  |

TABLE 20

Ink composition 21

|  |  | K | C | M | Y |
|---|---|---|---|---|---|
| Pigment dispersion liquid | 1 | 12.5 |  |  |  |
|  | 2 |  | 12.5 |  |  |
|  | 4 |  |  | 21.0 |  |
|  | 3 |  |  |  | 15.0 |
| Polymerizable compound (A) | NK ESTER A-400 (manufactured by Shin Nakamura Chemical Co., Ltd.) | 31.5 | 31.5 | 23.0 | 29.0 |
| Polymerizable compound (A) | Miramer M3160 (manufactured by Miwon Commercial Co., Ltd.) | 15.0 | 15.0 | 15.0 | 15.0 |
| Polymerizable compound (A) | Miramer M4004 (manufactured by Miwon Commercial Co., Ltd.) | 5.0 | 5.0 | 5.0 | 5.0 |
| Polymerizable compound (B) | NK ESTER A-DCP (manufactured by Shin Nakamura Chemical Co., Ltd.) | 22.0 | 22.0 | 22.0 | 22.0 |
| Gelling agent | Stearyl stearate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 21

Ink composition 22

|  |  | K | C | M | Y |
|---|---|---|---|---|---|
| Pigment dispersion liquid | 1 | 12.5 |  |  |  |
|  | 2 |  | 12.5 |  |  |
|  | 4 |  |  | 21.0 |  |
|  | 3 |  |  |  | 15.0 |
| Polymerizable compound (A) | CD561 (manufactured by Sartomer LLC) | 28.5 | 28.5 | 20.0 | 26.0 |
| Polymerizable compound (A) | SR499 (manufactured by Sartomer LLC) | 15.0 | 15.0 | 15.0 | 15.0 |
| Polymerizable compound (A) | SR494 (manufactured by Sartomer LLC) | 10.0 | 10.0 | 10.0 | 10.0 |
| Polymerizable compound (B) | Photomer 4072 (manufactured by Cognis Corp.) | 20.0 | 20.0 | 20.0 | 20.0 |
| Gelling agent | Behenic acid 5% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 22

Ink composition 23

|  |  | K | C | M | Y |
|---|---|---|---|---|---|
| Pigment dispersion liquid | 1 | 12.5 |  |  |  |
|  | 2 |  | 12.5 |  |  |
|  | 4 |  |  | 21.0 |  |
|  | 3 |  |  |  | 15.0 |
| Polymerizable compound (A) | CD561 (manufactured by Sartomer LLC) | 30.5 | 30.5 | 22.0 | 28.0 |
| Polymerizable compound (A) | SR499 (manufactured by Sartomer LLC) | 15.0 | 15.0 | 15.0 | 15.0 |
| Polymerizable compound (A) | SR494 (manufactured by Sartomer LLC) | 10.0 | 10.0 | 10.0 | 10.0 |
| Polymerizable compound (B) | Photomer 4072 (manufactured by Cognis Corp.) | 20.0 | 20.0 | 20.0 | 20.0 |
| Gelling agent | Distearyl ketone 3% | 3.0 | 3.0 | 3.0 | 3.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 23

Ink composition 24

|  |  | K | C | M | Y |
|---|---|---|---|---|---|
| Pigment dispersion liquid | 1 | 12.5 |  |  |  |
|  | 2 |  | 12.5 |  |  |
|  | 4 |  |  | 21.0 |  |
|  | 3 |  |  |  | 15.0 |
| Polymerizable compound (A) | CD561 (manufactured by Sartomer LLC) | 28.5 | 28.5 | 20.0 | 26.0 |
| Polymerizable compound (A) | SR499 (manufactured by Sartomer LLC) | 15.0 | 15.0 | 15.0 | 15.0 |
| Polymerizable compound (A) | SR494 (manufactured by Sartomer LLC) | 10.0 | 10.0 | 10.0 | 10.0 |
| Polymerizable compound (B) | Photomer 4072 (manufactured by Cognis Corp.) | 20.0 | 20.0 | 20.0 | 20.0 |
| Gelling agent | Cetyl palmitate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 24

Ink composition 25

|  |  | K | C | M | Y |
|---|---|---|---|---|---|
| Pigment dispersion liquid | 1 | 12.5 |  |  |  |
|  | 2 |  | 12.5 |  |  |
|  | 4 |  |  | 21.0 |  |
|  | 3 |  |  |  | 15.0 |
| Polymerizable compound (A) | CD561 (manufactured by Sartomer LLC) | 29.5 | 29.5 | 21.0 | 27.0 |
| Polymerizable compound (A) | SR499 (manufactured by Sartomer LLC) | 15.0 | 15.0 | 15.0 | 15.0 |
| Polymerizable compound (A) | SR494 (manufactured by Sartomer LLC) | 10.0 | 10.0 | 10.0 | 10.0 |
| Polymerizable compound (B) | Photomer 4072 (manufactured by Cognis Corp.) | 20.0 | 20.0 | 20.0 | 20.0 |
| Gelling agent | Cetyl palmitate 3%, behenyl behenate 1% | 4.0 | 4.0 | 4.0 | 4.0 |
| Surfactant | KF-352 (Shin-Etsu Chemical Co., Ltd.) | 0.1 | 0.1 | 0.1 | 0.1 |

TABLE 24-continued

Ink composition 25

| | | K | C | M | Y |
|---|---|---|---|---|---|
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 25

Ink composition 26

| | | K | C | M | Y |
|---|---|---|---|---|---|
| Pigment dispersion liquid | 1 | 12.5 | | | |
| | 2 | | 12.5 | | |
| | 4 | | | 21.0 | |
| | 3 | | | | 15.0 |
| Polymerizable compound (A) | CD561 (manufactured by Sartomer LLC) | 28.5 | 28.5 | 20.0 | 26.0 |
| Polymerizable compound (A) | SR499 (manufactured by Sartomer LLC) | 15.0 | 15.0 | 15.0 | 15.0 |
| Polymerizable compound (A) | SR494 (manufactured by Sartomer LLC) | 10.0 | 10.0 | 10.0 | 10.0 |
| Polymerizable compound (B) | Photomer 4072 (manufactured by Cognis Corp.) | 20.0 | 20.0 | 20.0 | 20.0 |
| Gelling agent | Stearyl stearate 5% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 26

Ink composition 27

| | | K | C | M | Y |
|---|---|---|---|---|---|
| Pigment dispersion liquid | 1 | 12.5 | | | |
| | 2 | | 12.5 | | |
| | 4 | | | 21.0 | |
| | 3 | | | | 15.0 |
| Polymerizable compound (A) | CD561 (manufactured by Sartomer LLC) | 33.5 | 33.5 | 25.0 | 31.0 |
| Polymerizable compound (A) | SR499 (manufactured by Sartomer LLC) | 15.0 | 15.0 | 15.0 | 15.0 |
| Polymerizable compound (A) | SR494 (manufactured by Sartomer LLC) | 5.0 | 5.0 | 5.0 | 5.0 |
| Polymerizable compound (B) | NK ESTER A-DCP (manufactured by Shin Nakamura Chemical Co., Ltd.) | 20.0 | 20.0 | 20.0 | 20.0 |
| Gelling agent | Behenic acid 5% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 27

Ink composition 28

| | | K | C | M | Y |
|---|---|---|---|---|---|
| Pigment dispersion liquid | 1 | 12.5 | | | |
| | 2 | | 12.5 | | |
| | 4 | | | 21.0 | |
| | 3 | | | | 15.0 |
| Polymerizable compound (A) | CD561 (manufactured by Sartomer LLC) | 35.5 | 35.5 | 27.0 | 33.0 |
| Polymerizable compound (A) | SR499 (manufactured by Sartomer LLC) | 15.0 | 15.0 | 15.0 | 15.0 |
| Polymerizable compound (A) | SR494 (manufactured by Sartomer LLC) | 5.0 | 5.0 | 5.0 | 5.0 |
| Polymerizable compound (B) | NK ESTER A-DCP (manufactured by Shin Nakamura Chemical Co., Ltd.) | 20.0 | 20.0 | 20.0 | 20.0 |
| Gelling agent | Distearyl ketone 3% | 3.0 | 3.0 | 3.0 | 3.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 28

Ink composition 29

| | | K | C | M | Y |
|---|---|---|---|---|---|
| Pigment dispersion liquid | 1 | 12.5 | | | |
| | 2 | | 12.5 | | |
| | 4 | | | 21.0 | |
| | 3 | | | | 15.0 |
| Polymerizable compound (A) | CD561 (manufactured by Sartomer LLC) | 33.5 | 33.5 | 25.0 | 31.0 |
| Polymerizable compound (A) | SR499 (manufactured by Sartomer LLC) | 15.0 | 15.0 | 15.0 | 15.0 |
| Polymerizable compound (A) | SR494 (manufactured by Sartomer LLC) | 5.0 | 5.0 | 5.0 | 5.0 |
| Polymerizable compound (B) | NK ESTER A-DCP (manufactured by Shin Nakamura Chemical Co., Ltd.) | 20.0 | 20.0 | 20.0 | 20.0 |
| Gelling agent | Cetyl palmitate 3%, distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 29

Ink composition 30

| | | K | C | M | Y |
|---|---|---|---|---|---|
| Pigment dispersion liquid | 1 | 12.5 | | | |
| | 2 | | 12.5 | | |
| | 4 | | | 21.0 | |
| | 3 | | | | 15.0 |
| Polymerizable compound (A) | CD561 (manufactured by Sartomer LLC) | 34.5 | 34.5 | 26.0 | 32.0 |
| Polymerizable compound (A) | SR499 (manufactured by Sartomer LLC) | 15.0 | 15.0 | 15.0 | 15.0 |
| Polymerizable compound (A) | SR494 (manufactured by Sartomer LLC) | 5.0 | 5.0 | 5.0 | 5.0 |
| Polymerizable compound (B) | NK ESTER A-DCP (manufactured by Shin Nakamura Chemical Co., Ltd.) | 20.0 | 20.0 | 20.0 | 20.0 |
| Gelling agent | Cetyl palmitate 3%, behenyl behenate 1% | 4.0 | 4.0 | 4.0 | 4.0 |
| Surfactant | KF-352 (Shin-Etsu | 0.1 | 0.1 | 0.1 | 0.1 |

TABLE 29-continued

Ink composition 30

|  |  | K | C | M | Y |
|---|---|---|---|---|---|
|  | Chemical Co., Ltd.) |  |  |  |  |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

TABLE 30

Ink composition 31

|  |  | K | C | M | Y |
|---|---|---|---|---|---|
| Pigment dispersion liquid | 1 | 12.5 |  |  |  |
|  | 2 |  | 12.5 |  |  |
|  | 4 |  |  | 21.0 |  |
|  | 3 |  |  |  | 15.0 |
| Polymerizable compound (A) | CD561 (manufactured by Sartomer LLC) | 33.5 | 33.5 | 25.0 | 31.0 |
| Polymerizable compound (A) | SR499 (manufactured by Sartomer LLC) | 15.0 | 15.0 | 15.0 | 15.0 |
| Polymerizable compound (A) | SR494 (manufactured by Sartomer LLC) | 5.0 | 5.0 | 5.0 | 5.0 |
| Polymerizable compound (B) | NK ESTER A-DCP (manufactured by Shin Nakamura Chemical Co., Ltd.) | 20.0 | 20.0 | 20.0 | 20.0 |
| Gelling agent | Stearyl stearate 5% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | DAROCURE TPO (Ciba) | 5.0 | 5.0 | 5.0 | 5.0 |
| Photoinitiator | ITX (DKSH) | 2.0 | 2.0 | 2.0 | 2.0 |
| Sensitizing aid | Kayacure EPA (Nippon Kayaku Co., Ltd.) | 2.0 | 2.0 | 2.0 | 2.0 |

<<Inkjet Image Forming Method>>

Each of the ink compositions prepared as described above was loaded in an inkjet recording apparatus having an inkjet recording head equipped with piezo-type inkjet nozzles. Using this apparatus, image recording was continuously carded out on 500 sheets of half kiku-sized coated paper (OK OVERCOAT, manufactured by Oji Paper Co., Ltd.) and high quality paper (OK PRINCE HIGH QUALITY, manufactured by Oji Paper Co., Ltd.). The conveyance speed of the recording material was set at two conditions, namely, 30 m/s and 60 m/s.

Although not illustrated in the diagram, the ink supplying system was composed of an ink tank, a supplying pipe, a sub-ink tank immediately before the head, filter-attached piping, and a piezo head, and the ink supply system was warmed to 100° C. by heating from the entire tank to the head portion. At the piezo head, a voltage was applied such that liquid droplets of 2 rd would be obtained, and the ink was ejected using four heads at a resolution of 360 dpi for each color. Thus, solid images of single colors YMCK and solid images of secondary colors of RGB at 1440×1440 dpi were formed.

After printing, the ink was cured using an LED lamp (8 W/cm$^2$, water cooled unit) manufactured by Phoseon Technology, Inc. Light was irradiated at a distance of 5 min from the pipe surface (width of irradiation in the conveyance direction: 20 mm).

<<Various Evaluations>>
<Dissolution Stability of Gelling Agent>

Y inks of various ink compositions were used to visually observe the dissolution state after standing for 4 hours at 100° C.

◯: No separation or precipitation x: Oil droplets have gathered at the surface (layer separation has occurred)

<Ink Foul Odor>

Y inks of various ink compositions were used to evaluate the foul odor of the ink upon heating to 100° C.

◯: Less odorous x: Has a strong stinking odor

<Image Quality (White Spots)>

Image printouts of various samples were visually checked to see whether white spots (unprinted parts caused by dot coalescence) are present in 100% printed area at the time of printing on the $10^{th}$ sheet and the $500^{th}$ sheet.

◯: No white spots

Δ: White spots were found in one or two sites, but to a level without any problem for practical use.

x: Many white spots have occurred.

<Image Quality (Printed Letter Quality)>

Image printouts of various samples were visually evaluated for the quality of 3-pt Mincho letters at the time of printing on the $10^{th}$ sheet and the $500^{th}$ sheet.

◯: Reproducible

Δ: Collapse of some letters is observed.

x: Letters have collapsed.

<Image Quality (Gloss)>

For image printouts of various samples on OK TOP paper, the 60°-gloss value of 100% printed area on $10^{th}$ sheet was measured, ◯: 15 to 60

Δ: 61 to 100 and 1 to 14

(On many coated papers and art papers such as OK TOP paper, a gloss value in the range of 15 to 60 is preferable without the feeling of incompatibility with the white background of paper.)

<Evaluation of Curability (Pencil Hardness)>

For image printouts of various samples on OK TOP paper, a 100% printed area on the $10^{th}$ sheet was left to stand for 24 hours in an environment at 25° C. and 60% RH, and then the pencil hardness of the surface was measured according to JIS-K-5400. The pencil hardness was evaluated according to the following criteria, and was used as one of the indices for curability.

◯: Pencil hardness of 2H or higher

Δ: B, F, and H x: 2B or lower

<Resistance to Folding>

For image printouts of various samples on OK TOP paper, a 100% printed area on the $10^{th}$ sheet was left to stand for 24 hours in an environment at 25° C. and 60% RH, and then the paper was folded into halves.

◯: The image film is not damaged.

x: The image film is damaged at the folded portion.

<Image Preservation Properties>

For image printouts of various samples on OK TOP paper, a 100% printed area on the $10^{th}$ sheet was left to stand for one month in an environment at 40° C. and 80% RH, and then the image surface was visually checked.

◯: No precipitate

Δ: A faint white precipitate is present.

The results for the evaluations described above are summarized in Table 31, Table 32, and Table 33

TABLE 31

| Sample No. | Ink composition | Conveyance speed (m/min) | Phase transition temperature (° C.) | Recording material temperature (° C.) | Temperature Δ (° C.) | Remarks |
|---|---|---|---|---|---|---|
| 1 | Ink composition 1 | 30 | 80 | 44 | 36 | Comparative |
| 2 | Ink composition 2 | 30 | 60 | 44 | 16 | Comparative |
| 3 | Ink composition 3 | 30 | 65 | 44 | 21 | Comparative |
| 4 | Ink composition 4 | 30 | 60 | 44 | 16 | Comparative |
| 5 | Ink composition 5 | 30 | 58 | 44 | 14 | Comparative |
| 6 | Ink composition 6 | 30 | 56 | 44 | 12 | Comparative |
| 7 | Ink composition 7 | 30 | 58 | 44 | 14 | Comparative |
| 8 | Ink composition 8 | 30 | 65 | 44 | 21 | This Invention |
| 9 | Ink composition 9 | 30 | 50 | 44 | 6 | Comparative |
| 10 | Ink composition 10 | 30 | 67 | 44 | 23 | Comparative |
| 11 | Ink composition 11 | 30 | 60 | 44 | 16 | This invention |
| 12 | Ink composition 12 | 30 | 60 | 44 | 16 | This invention |
| 13 | Ink composition 13 | 30 | 60 | 44 | 16 | This invention |
| 14 | Ink composition 14 | 30 | 60 | 44 | 16 | This invention |
| 15 | Ink composition 15 | 30 | 60 | 44 | 16 | This invention |
| 16 | Ink composition 16 | 30 | 60 | 44 | 16 | This invention |
| 17 | Ink composition 17 | 30 | 60 | 44 | 16 | This invention |
| 18 | Ink composition 18 | 30 | 60 | 44 | 16 | This invention |
| 19 | Ink composition 19 | 30 | 60 | 44 | 16 | This invention |
| 20 | Ink composition 20 | 30 | 60 | 44 | 16 | This invention |
| 21 | Ink composition 21 | 30 | 60 | 44 | 16 | This invention |
| 22 | Ink composition 22 | 30 | 55 | 40 | 15 | This invention |
| 23 | Ink composition 23 | 30 | 68 | 50 | 18 | This invention |
| 24 | Ink composition 24 | 30 | 57 | 42 | 15 | This invention |
| 25 | Ink composition 25 | 30 | 60 | 44 | 16 | This invention |
| 26 | Ink composition 26 | 30 | 55 | 40 | 15 | This invention |
| 27 | Ink composition 27 | 30 | 55 | 40 | 15 | This invention |
| 28 | Ink composition 28 | 30 | 68 | 50 | 18 | This invention |
| 29 | Ink composition 29 | 30 | 57 | 42 | 15 | This invention |
| 30 | Ink composition 30 | 30 | 60 | 44 | 16 | This invention |
| 31 | Ink composition 31 | 30 | 55 | 40 | 15 | This invention |
| 32 | Ink composition 12 | 30 | 60 | 30 | 30 | This invention |
| 33 | Ink composition 13 | 30 | 60 | 30 | 30 | This invention |
| 34 | Ink composition 12 | 60 | 60 | 44 | 16 | This invention |
| 35 | Ink composition 13 | 60 | 60 | 44 | 16 | This invention |
| 36 | Ink composition 31 | 60 | 60 | 44 | 16 | This invention |
| 37 | Ink composition 9 | 60 | 50 | 44 | 6 | Comparative |

TABLE 32

| | 10th sheet | | | | | | | | 500th sheet | | |
|---|---|---|---|---|---|---|---|---|---|---|---|
| Sample No. | Gel dissolution stability After standing at 100° C. for 4 hrs | Ink foul odor Upon heating to 100° C. | White spots 100% printed area Coated paper | Printed letter quality 3-pt Mincho Ordinary paper | Solid image surface gloss 100% printed area, 60° Coated paper | Pencil hardness (curability) Coated paper | Resistance to folding Coated paper | Image preservation *1 Coated paper | White spots 100% printed area Coated paper | Printed letter quality 3-pt Mincho Ordinary paper | Remarks |
| 1 | ○ | X | ○ | ○ | Δ | X | ○ | ○ | ○ | ○ | Comparative |
| 2 | ○ | X | ○ | Δ | Δ | X | X | ○ | ○ | X | Comparative |
| 3 | X | ○ | ○ | ○ | ○ | ○ | ○ | ○ | X | X | Comparative |
| 4 | X | ○ | ○ | ○ | ○ | ○ | ○ | ○ | Δ | Δ | Comparative |
| 5 | ○ | ○ | ○ | ○ | ○ | Δ | X | ○ | ○ | ○ | Comparative |
| 6 | X | ○ | ○ | ○ | ○ | Δ | X | ○ | Δ | Δ | Comparative |
| 7 | ○ | ○ | ○ | ○ | ○ | ○ | X | ○ | ○ | ○ | Comparative |
| 8 | X | ○ | ○ | ○ | ○ | X | ○ | ○ | Δ | Δ | Comparative |
| 9 | ○ | ○ | X | X | Δ | ○ | ○ | ○ | X | X | Comparative |
| 10 | X | ○ | ○ | ○ | Δ | X | ○ | ○ | Δ | Δ | Comparative |
| 11 | ○ | ○ | ○ | ○ | ○ | ○ | ○ | ○ | ○ | ○ | This invention |
| 12 | ○ | ○ | ○ | ○ | ○ | ○ | ○ | ○ | ○ | ○ | This invention |
| 13 | ○ | ○ | ○ | ○ | ○ | ○ | ○ | ○ | ○ | ○ | This invention |
| 14 | ○ | ○ | ○ | ○ | ○ | ○ | ○ | ○ | ○ | ○ | This invention |
| 15 | ○ | ○ | ○ | ○ | ○ | ○ | ○ | ○ | ○ | ○ | This invention |
| 16 | ○ | ○ | ○ | ○ | ○ | ○ | ○ | ○ | ○ | ○ | This invention |
| 17 | ○ | ○ | ○ | ○ | ○ | ○ | ○ | ○ | ○ | ○ | This invention |
| 18 | ○ | ○ | ○ | ○ | ○ | ○ | ○ | ○ | ○ | ○ | This invention |

TABLE 32-continued

|  | 10th sheet | | | | | | | | 500th sheet | | |
|---|---|---|---|---|---|---|---|---|---|---|---|
| Sample No. | Gel dissolution stability After standing at 100° C. for 4 hrs | Ink foul odor Upon heating to 100° C. | White spots 100% printed area Coated paper | Printed letter quality 3-pt Mincho Ordinary paper | Solid image surface gloss 100% printed area, 60° Coated paper | Pencil hardness (curability) Coated paper | Resistance to folding Coated paper | Image preservation *1 Coated paper | White spots 100% printed area Coated paper | Printed letter quality 3-pt Mincho Ordinary paper | Remarks |
| 19 | ○ | ○ | ○ | ○ | ○ | ○ | ○ | ○ | ○ | ○ | This invention |
| 20 | ○ | ○ | ○ | ○ | ○ | ○ | ○ | ○ | ○ | ○ | This invention |

*1: One month at 40° C. and 80% RH

TABLE 33

|  | 10th sheet | | | | | | | | 500th sheet | | |
|---|---|---|---|---|---|---|---|---|---|---|---|
| Sample No. | Gel dissolution stability After standing at 100° C. for 4 hrs | Ink foul odor Upon heating to 100° C. | White spots 100% printed area Coated paper | Printed letter quality 3-pt Mincho Ordinary paper | Solid image surface gloss 100% printed area, 60° Coated paper | Pencil hardness (curability) Coated paper | Resistance to folding Coated paper | Image preservation *1 Coated paper | White spots 100% printed area Coated paper | Printed letter quality 3-pt Mincho Ordinary paper | Remarks |
| 21 | ○ | ○ | ○ | ○ | ○ | ○ | ○ | ○ | ○ | ○ | This invention |
| 22 | ○ | ○ | ○ | ○ | ○ | ○ | ○ | Δ | ○ | ○ | This invention |
| 23 | ○ | ○ | ○ | ○ | ○ | ○ | ○ | ○ | ○ | ○ | This invention |
| 24 | ○ | ○ | ○ | ○ | ○ | ○ | ○ | ○ | ○ | ○ | This invention |
| 25 | ○ | ○ | ○ | ○ | ○ | ○ | ○ | ○ | ○ | ○ | This invention |
| 26 | ○ | ○ | ○ | ○ | ○ | ○ | ○ | ○ | ○ | ○ | This invention |
| 27 | ○ | ○ | ○ | ○ | ○ | ○ | ○ | Δ | ○ | ○ | This invention |
| 28 | ○ | ○ | ○ | ○ | ○ | ○ | ○ | ○ | ○ | ○ | This invention |
| 29 | ○ | ○ | ○ | ○ | ○ | ○ | ○ | ○ | ○ | ○ | This invention |
| 30 | ○ | ○ | ○ | ○ | ○ | ○ | ○ | ○ | ○ | ○ | This invention |
| 31 | ○ | ○ | ○ | ○ | ○ | ○ | ○ | ○ | ○ | ○ | This invention |
| 32 | ○ | ○ | ○ | ○ | Δ | ○ | ○ | ○ | ○ | ○ | This invention |
| 33 | ○ | ○ | ○ | ○ | Δ | ○ | ○ | ○ | ○ | ○ | This invention |
| 34 | ○ | ○ | ○ | ○ | ○ | ○ | ○ | ○ | ○ | ○ | This invention |
| 35 | ○ | ○ | ○ | ○ | ○ | ○ | ○ | ○ | ○ | ○ | This invention |
| 36 | ○ | ○ | Δ | Δ | ○ | ○ | ○ | ○ | Δ | Δ | This invention |
| 37 | ○ | ○ | X | X | Δ | ○ | ○ | ○ | X | X | Comparative |

*1: One month at 40° C. and 80% RH

As is obvious from the results illustrated in Table 32 and Table 33, in various evaluations, it was found that the images formed using the active ray-curable inkjet inks of the present invention were superior to the images formed using comparative inks.

That is, it is understood that high precision images can be stably formed even in high speed recording through the means of the present invention, and an active ray-curable inkjet ink having satisfactory adaptability to various recording materials can be provided. It is also understood that an image forming method using, the active ray-curable inkjet ink can be provided.

The present patent application claim, priority based on Japanese Patent Application No. 2011-037973 filed on Feb. 24, 2011. The matters described in the specification and drawings of the relevant patent application are all incorporated herein by reference.

INDUSTRIAL APPLICABILITY

According to the present invention, an active ray-curable inkjet ink which can form high precision images stably even in high speed recording, and has satisfactory adaptability to various recording materials, is provided. Also, an image forming method using the active ray-curable inkjet ink is provided.

REFERENCE SIGNS LIST

1 Light emitting diode (LED)
2 Head carriage
3 Inkjet recording head

The invention claimed is:
1. An active ray-curable inkjet ink comprising:
gelling agent, photopolymerizable compounds, and a photoinitiator,
the inkjet ink undergoing reversible sol-gel phase transition depending on temperature,
wherein:
(1) a first photopolymerizable compound of the photopolymerizable compounds is a (meth)acrylate compound having a molecular weight in the range of 300 to 1500 and having 3 to 14 unit structures represented by formula: ($-CH_2-CH_2-O-$) in the molecule, in an amount in the range of 30% to 70% by mass relative to the total mass of the ink;

(2) a second photopolymerizable compound of the photopolymerizable compounds is a (meth)acrylate compound having a molecular weight in the range of 300 to 1500 and having a ClogP value in the range of 4.0 to 7.0, in an amount in the range of 10% to 40% by mass relative to the total mass of the ink;

(3) the gelling agent has a total carbon number of 12 or greater and contains a linear or branched alkyl chain having 3 or more carbon atoms, and a content of the gelling agent is not more than 10% bar mass relative to the total mass of the ink.

2. The active ray-curable inkjet ink according to claim 1, wherein the active ray-curable inkjet ink further comprises a coloring material.

3. The active ray-curable inkjet ink according to claim 1, wherein the second photopolymerizable compound is at least one (meth)acrylate compound selected from the group consisting of:

(4) a trifunctional or higher-functional (meth)acrylate compound having 3 to 14 unit structures represented by formula: (—C(CH$_3$)H—CH$_2$—O—) in the molecule; and (5) a bifunctional or higher-functional (meth)acrylate compound having a cyclic structure in the molecule.

4. The active ray-curable inkjet ink according to claim 1, wherein the gelling agent is at least one compound selected from the group consisting of the compounds represented by the following Formulas (G1) and (G2):

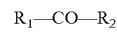   Formula (G1)

   Formula (G2)

wherein R$_1$ to R$_4$ each independently represent an alkyl chain having a straight-chained moiety having 3 to 36 carbon atoms, which may have a branch.

5. An image forming method using the active ray-curable inkjet ink according to claim 1, wherein when the active ray-curable inkjet ink impacts on a recording material, the temperature of the recording material is adjusted to the range of (sol-gel phase transition temperature+20° C.) to (sol-gel phase transition temperature+−10° C.) of the active ray-curable inkjet ink.

6. The active ray-curable inkjet ink according to claim 1, wherein the content of the gelling agent is more than 1% and not more than 10% by mass relative to the total mass of the ink.

7. The active ray-curable inkjet ink according to claim 1, wherein the content of the gelling agent is not less than 2% and not more than 10% by mass relative to the total mass of the ink.

8. The image forming method according to claim 5, wherein the recording material is selected from the group consisting of a coated paper for printing, a coated paper B for printing, a high quality paper, and a resin film.

* * * * *